United States Patent [19]

D'Amato

[11] Patent Number: 4,590,137

[45] Date of Patent: May 20, 1986

[54] METHOD AND APPARATUS FOR SCREENING LINE SCREEN SLIT MASK COLOR PICTURE TUBES

[75] Inventor: Ralph J. D'Amato, Lancaster, Pa.

[73] Assignee: RCA Corporation, Princeton, N.J.

[21] Appl. No.: 595,531

[22] Filed: Mar. 30, 1984

[51] Int. Cl.[4] .......................... G03C 5/00; G03B 41/00

[52] U.S. Cl. .......................................... 430/24; 430/26; 354/1

[58] Field of Search .................. 430/23, 24, 26; 354/1

[56] References Cited

U.S. PATENT DOCUMENTS

| | | | |
|---|---|---|---|
| 3,780,629 | 12/1973 | Barten et al. | 354/1 |
| 3,890,151 | 6/1975 | Suzuki et al. | 430/24 |
| 4,001,842 | 1/1977 | Suzuki et al. | 354/1 |
| 4,049,451 | 9/1977 | Law | 430/24 |
| 4,066,924 | 3/1978 | Rublack | 313/408 |
| 4,078,239 | 3/1978 | Prazak et al. | 354/1 |
| 4,110,760 | 8/1978 | Van Ness | 354/1 |
| 4,152,154 | 5/1979 | Greenen et al. | 430/24 |
| 4,370,036 | 1/1983 | Kelly et al. | 354/1 |
| 4,414,318 | 11/1983 | Nishizawa et al. | 430/24 |
| 4,516,841 | 5/1985 | Ragland, Jr. | 354/1 |

*Primary Examiner*—John E. Kittle

*Assistant Examiner*—José G. Dees

*Attorney, Agent, or Firm*—E. M. Whitacre; D. H. Irlbeck; L. L. Hallacher

[57] ABSTRACT

The present invention is an improvement in a method and apparatus for screening a line screen slit mask color picture tube. Such method includes coating a faceplate panel of the tube with a photosensitive material, inserting a slit shadow mask into the panel, and exposing the photosensitive material by passing light from a line light source through the slits of the mask. The improvement comprises positioning, between the light source and the shadow mask, means for varying the effective length of the line light source when viewed from different locations on the faceplate panel.

In a preferred embodiment, the means for varying the effective length of the line light source are curved louvers placed adjacent the light source which, when viewed from the center of the panel, shadow the ends of the light source, but which, when viewed from the ends of the minor axis of the panel, expose an effectively longer light source. In another preferred embodiment, striped patterns on a glass plate are used to effect a similar result.

3 Claims, 11 Drawing Figures

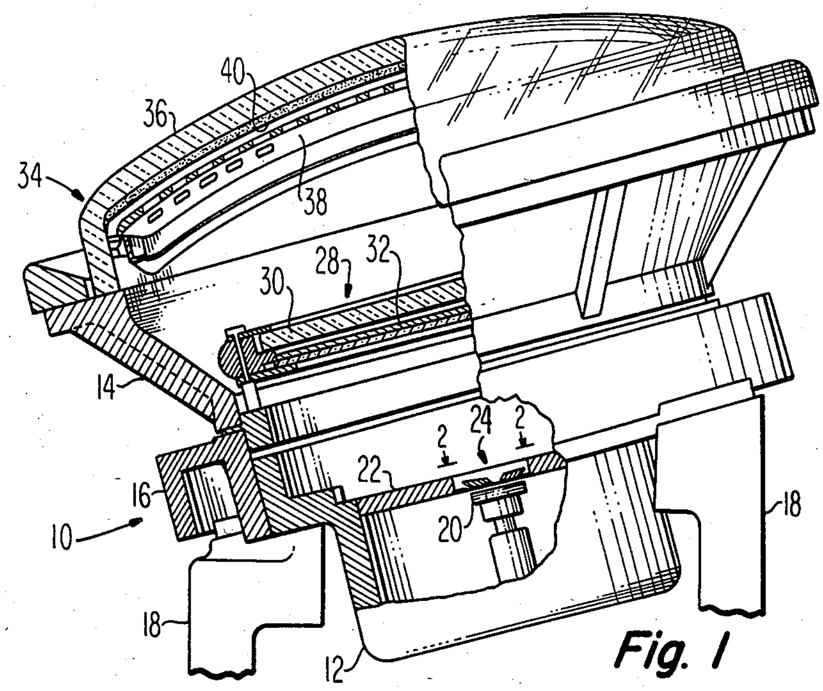
Fig. 1
Fig. 6 a)
Fig. 6 b)
Fig. 6 c)
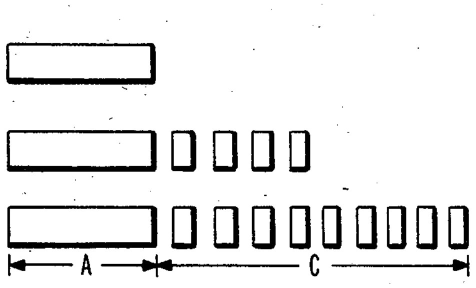
Fig. 7 a)
Fig. 7 b)
Fig. 7 c)
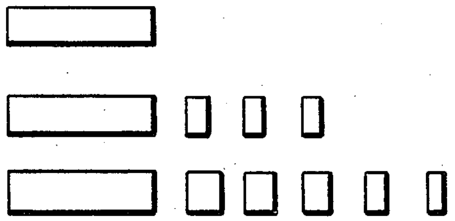

METHOD AND APPARATUS FOR SCREENING LINE SCREEN SLIT MASK COLOR PICTURE TUBES

This invention relates to a method and apparatus for screening a color picture tube line screen by a photographic technique that uses a slit shadow mask of the tube as a photomaster, and particularly to such method and apparatus wherein the effective length of a line light source used during screening is varied by novel means in exposing different areas of the line screen.

Most color picture tubes presently being manufactured are of the line screen slit mask type. These tubes have spherically contoured rectangular faceplates, with line screens of cathodoluminescent materials thereon, and somewhat spherically contoured slit-apertured shadow masks adjacent to the screens. The mask slits are aligned in parallel vertical columns, with each column containing a plurality of slits which are vertically separated by bridge or web portions of the mask. The line screens in these tubes include peripheral borders having slightly curved sides and rounded corners. Such line screen slit mask type tubes are screened by a photographic method that utilizes a line light source, such as disclosed in U.S. Pat. No. 4,049,451, issued to H. B. Law on Sept. 20, 1977.

Most line screen color picture tubes with slotted or slit aperture masks have continuous phosphor lines. This is achieved by exposing the phosphor lines from a line source having a length of about 10 mm or longer. The image of the line source on the screen forms a penumbra, which bridges the mask tie bar shadow to produce a continuous phosphor line. If the length of the lamp image is equal to the pitch of the tie bar shadow, the resulting line will have a constant width. When the lamp is shorter or longer than this length, the printed line will display necking (narrowing) or a bump (widening), respectively. However, the criterion for the vertical spacing of the tie bars is to minimize scan moire problems. Such vertical tie bar spacing results in a printing condition which cannot satisfy the constant width phosphor line requirement with a constant light source length. To overcome this condition with present designs, a compromise source length is selected, and the image definition is smoothed by translating the panel parallel to the image during exposure. This approach is costly both in time and in equipment.

Recently, tubes have been developed that have more truly rectangular viewing screens. With the advent of these tubes, the orientation of the projected line light source image results in a serious degradation of the integrated image sharpness or exposure sensitivity, especially in the corners of the screen. Therefore, there is a need for an improved exposure method and an improved apparatus for forming these newer rectangular viewing screens, which does not have to compromise light source length, does not require mechanical translation of the panels and does not greatly affect exposure sensitivity.

SUMMARY OF THE INVENTION

The present invention is an improvement in a method and apparatus for screening a line screen slit mask color picture tube. Such method includes coating a faceplate panel of the tube with a photosensitive material, inserting a slit shadow mask into the panel, and exposing the photosensitive material by passing light from a line light source through the slits of the mask. The improvement comprises the positioning of a means, between the light source and the shadow mask, for varying the effective length of the line light source when viewed from different locations on the faceplate panel.

In a preferred embodiment, the means for varying the effective length of the line light source are curved louvers placed adjacent the light source which, when viewed from the center of the panel, shadow the ends of the light source, but which, when viewed from the ends of the minor axis of the panel, expose an effectively longer light source.

BRIEF DESCRIPTION OF THE DRAWINGS

FIG. 1 is an elevational view, partly in axial section, of a lighthouse exposure device used for screening color picture tubes.

Figure 2:
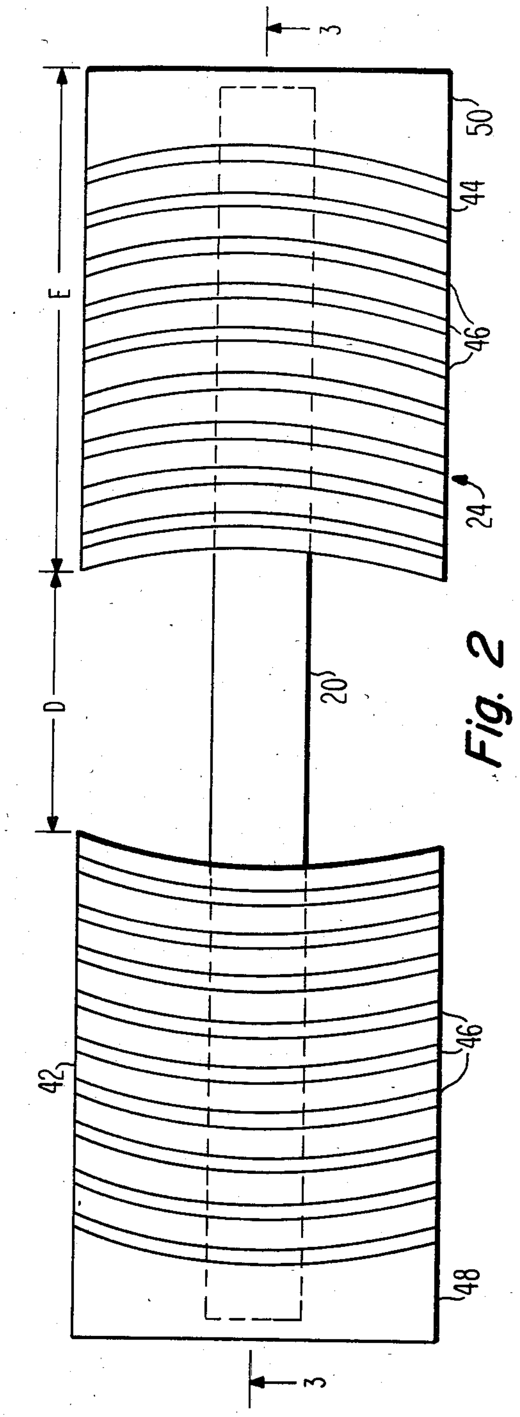
FIG. 2 is a plan view of a louvered aperture and a line light source of the exposure device, taken at line 2—2, of FIG. 1.
Figure 3:
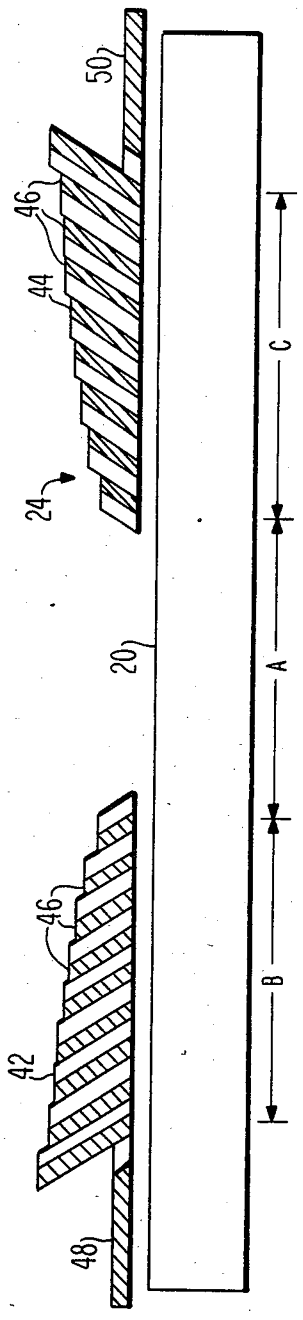
FIG. 3 is a side view of the louvered aperture and line light source, taken at line 3—3, of FIG. 2.
Figure 4:
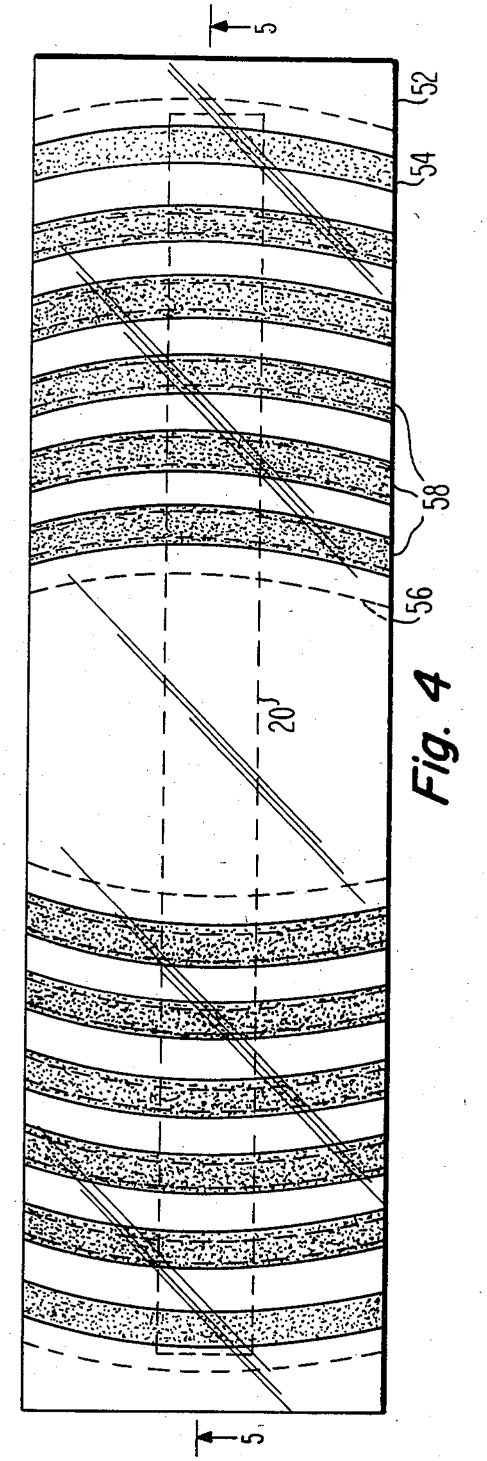
FIG. 4 is a plan view of a glass optical aperture having patterns of opaque strips thereon.
Figure 5:
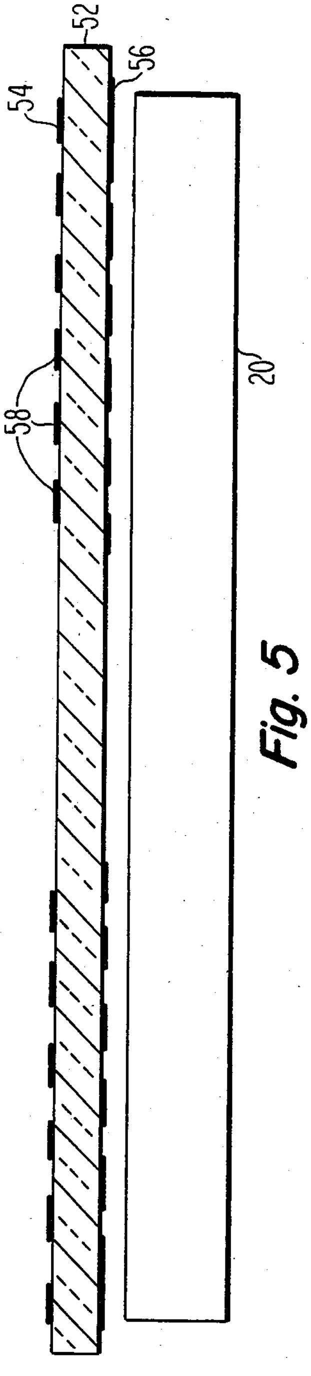
FIG. 5 is a partially sectioned side view of the glass optical aperture, taken at line 5—5, of FIG. 4.

FIGS. *6a* to *c* and *7a* to *c* representations of light source length along the minor axis for the louvered aperture of FIGS. 2 and 3 and the glass aperture of FIGS. 4 and 5, respectively.

DETAILED DESCRIPTION OF THE PREFERRED EMBODIMENT

FIG. 1 shows an exposure device, known as a lighthouse 10, which is used for screening a color picture tube. The lighthouse 10 comprises a light box 12 and panel support 14 held in position with respect to one another, by bolts (not shown), on a base 16 which is, in turn, supported at a desired angle by legs 18. A line light source 20 (typically a mercury arc lamp) is supported within the light box 12. An apertured plate 22 is positioned within the light box 12, above the line light source 20. A novel aperture assembly 24 within the plate 22 defines the effective length of the line light source 20 that is used during exposure. This aperture assembly 24 is described in greater detail below. Within the panel support 14 is a main correction lens assembly 28. The lens assembly 28 comprises a misregister correction lens 30, which refracts the light from the light source into paths taken by the electron beams during tube operation, and a light intensity correction filter 32, which compensates for the variations in light intensity in various parts of the lighthouse. A faceplate panel assembly 34 is mounted on the panel support 14. The panel assembly 34 includes a faceplate panel 36 and a slit shadow mask 38 mounted within the panel 36 by known means. The inside surface of the faceplate panel 36 is coated with a photosensitive material 40. During screening, the photosensitive material 40 is exposed by light from the line light source 20 after it passes through the aperture assembly 24 in the apertured plate 22, the filter 32, the misregister correction lens 30 and the shadow mask 38. The line light source 20 is tubular in shape and may be of a mercury arc type, such as the BH6 lamp manufactured by General Electric.

The aperture assembly 24 includes means for varying the effective length of the line light source 20 when viewed from different locations on the faceplate panel 36. The preferred embodiment of the aperture assembly 24 is shown in greater detail in FIGS. 2 and 3. The aperture assembly 24 comprises two facing sets 42 and 44 of louvers 46 positioned adjacent the line light source 20. The louvers 46 in each set are parallel to each other and are oriented at an acute angle with respect to the longitudinal axis of the line light source 20, as shown in FIG. 3. Each louver 46 also is curved, bowing away from the center of the aperture assembly 24, as shown in FIG. 2. The louvers 46 are shorter in height near the center of the assembly 24 and progressively increase in height with an increase in distance from the assembly center. Two flat plates 48 and 50 cover the ends of the light source 20.

Because of the aperture assembly 24, different portions of the line light source 20 are exposed to different areas of a faceplate panel. During screening, the minor axis of a faceplate panel is aligned with the longitudinal axis of the line light source 20. The center area of a panel is exposed by a center portion of the light source 20, designated A in FIG. 3. The area at one end of the minor axis of the panel is exposed with a longer effective portion of the light source 20 equal to A+B in FIG. 3. Similarly, the area at the other end of the minor axis of the panel is exposed with an effective portion of the light source equal to A+C. Because of the gradation in louver height, intermediate panel areas along the minor axis are exposed with effective light source lengths greater than A but less than A+B or A+C. The areas at the ends of the major axis of the panel are exposed with a shorter effective light source length than is the center portion of the panel. This shorter effective length, designated D in FIG. 2, is caused by the curvature of the louvers 46, the ends of which shield a portion of the line light source 20. Again, because of the curvature of the louvers, the intermediate areas along the major axis of the panel are exposed with effective light source lengths greater than D but less than A. Areas in the diagonal portions of the panel are exposed with circumferentially varying effective light source lengths that equal D+E on the diagonals and approach A+C near the minor axis and approach D near the major axis of the panel.

Rather than being constructed with louvers, the aperture assembly can be formed with appropriately patterned opaque stripes on a glass plate. FIGS. 4 and 5 show a glass plate 52 having two patterns 54 and 56 of curved stripes 58 on opposite surfaces thereof. The stripes 58 on the upper pattern 54 are offset in the longitudinal direction of the light source 20 from the stripes

58 of the lower pattern 56, to simulate the patterned shadowing effect of the above-described louvers. The spacings between stripes 58 of the lower pattern 56 are graded, with the spacing decreasing with increasing distance from the center of the plate 52. Of course, the positioning of these stripes 58 must take into account the refraction occurring at the glass-air interfaces.

FIGS. 6*a* to *c* and 7*a* to *c* show the effective light source lengths at three points along the minor axis of a tube faceplate for the louvered embodiment of FIGS. 2 and 3 and the stripe patterned embodiment of FIGS. 4 and 5, respectively. FIGS. 6*a* and 7*a* represent the effective light source length at the center of the faceplate, FIGS. 6*b* and 7*b* represent the effective light source length at a point halfway between the center and an end of the faceplate minor axis, and 6*c* and 7*c* represent the effective light source length at an end of the faceplate minor axis.

What is claimed is:

1. In a method of screening a line screen slit mask color picture tube, including coating a faceplate panel of said tube with a photosensitive material, said faceplate panel having a major axis and a minor axis, inserting a slit shadow mask into said panel, and exposing said photosensitive material by passing light from a line light source through the slits said mask, the improvement comprising:

positioning, between said light source and said shadow mask, a means for varying the effective length of said line light source, with respect to both said major and minor axes, when viewed from different locations on said faceplate panel, said means for varying the effective length of said line light source including an optical aperture having a plurality of shadowing elements therein, said shadowing elements providing exposure of a greater portion of said line light source at one location of said faceplate than at another location of said faceplate, whereby exposure at said one location is provided by said aperture and said shadowing elements and exposure at said another location is provided by said aperture.

2. The method as defined in claim 1, wherein said shadowing elements are louvers angled with respect to said line light source.

3. The method as defined in claim 1, wherein said shadowing elements are opaque stripes on opposite sides of a plate forming said optical aperture.

* * * * *

UNITED STATES PATENT AND TRADEMARK OFFICE
CERTIFICATE OF CORRECTION

PATENT NO. : 4,590,137

DATED : May 20, 1986

INVENTOR(S) : R.J. D'Amato

It is certified that error appears in the above-identified patent and that said Letters Patent is hereby corrected as shown below:

On the title page, under References Cited after line 8, add:

4,222,642 9/1980 Cornelis 354/1

Column 4, line 26, after "slits" insert -- of --.

Signed and Sealed this

Twenty-first Day of October, 1986

[SEAL]

*Attest:*

DONALD J. QUIGG

*Attesting Officer* *Commissioner of Patents and Trademarks*